Jan. 29, 1963     I. V. K. HOTT     3,075,789

BALANCING MECHANISM FOR TWO-WHEELED VEHICLES

Filed May 9, 1960

INVENTOR.
ION V. K. HOTT
BY
HIS ATTORNEYS

United States Patent Office 3,075,789
Patented Jan. 29, 1963

3,075,789
BALANCING MECHANISM FOR TWO-WHEELED VEHICLES
Ion Von Kert Hott, 216 E. Harmon Blvd.,
Dayton 19, Ohio
Filed May 9, 1960, Ser. No. 27,716
17 Claims. (Cl. 280—295)

This invention relates to a balancing mechanism and more particularly to a balancing mechanism for two-wheeled vehicles of the type commonly known as motor scooters, although not necessarily so limited.

An object of this invention is to provide a vehicle balancing mechanism which is more flexible in use than prior balancing mechanisms.

Prior balancing mechanisms for two-wheeled vehicles have generally been fixed in a single position whereby the vehicle is held upright. These balancing mechanisms are suitable for persons who are learning to operate the vehicles. However, as the operator's skill advances, or if others having greater skill operate the vehicle, the prior balancing mechanisms often hindered the full range of operation available.

Another object of this invention, then, is to overcome the disadvantages of the prior art devices by providing a vehicle balancing mechanism including a simple adjusting mechanism which enables the operator of the vehicle to either use the balancing mechanism or not use the balancing mechanism as he desires.

Another object of this invention is to provide a vehicle balancing mechanism which permits normal operation of the vehicle at relatively fast speeds, but may be adjusted to balance the mechanism at slow speeds and when the vehicle is at rest. This renders the balancing mechanism especially valuable for use in heavy traffic and on city streets where the vehicle must move slowly and stop frequently.

Another object of this invention is to provide a balancing mechanism including balance wheels mounted on the vehicle by a support mechanism which permits the balance wheels to follow the contour of an irregular surface on which the vehicle is moving, without substantially affecting the operation of the balancing mechanism. As will be more fully described below, this is accomplished by incorporating torsion members in the support mechanism for the balance wheels.

In the preferred embodiment of the invention, the balancing mechanism includes a control member which may be actuated by movement of the body of the operator of the vehicle. The control member adjusts the mechanism to either permit tilting movement of the vehicle or prevent tilting movement. Accordingly, a further object of this invention is to provide a balancing mechanism for a vehicle which may be adjusted by movement of the body of the operator.

Other objects and advantages reside in the construction of parts, the combination thereof, the method of manufacture and the mode of operation, as will become more apparent from the following description.

Referring to the drawings, FIGURE 1 is a perspective view of a two-wheeled vehicle provided with a balancing mechanism made in accordance with this invention.

Figures 1, 5, 7:
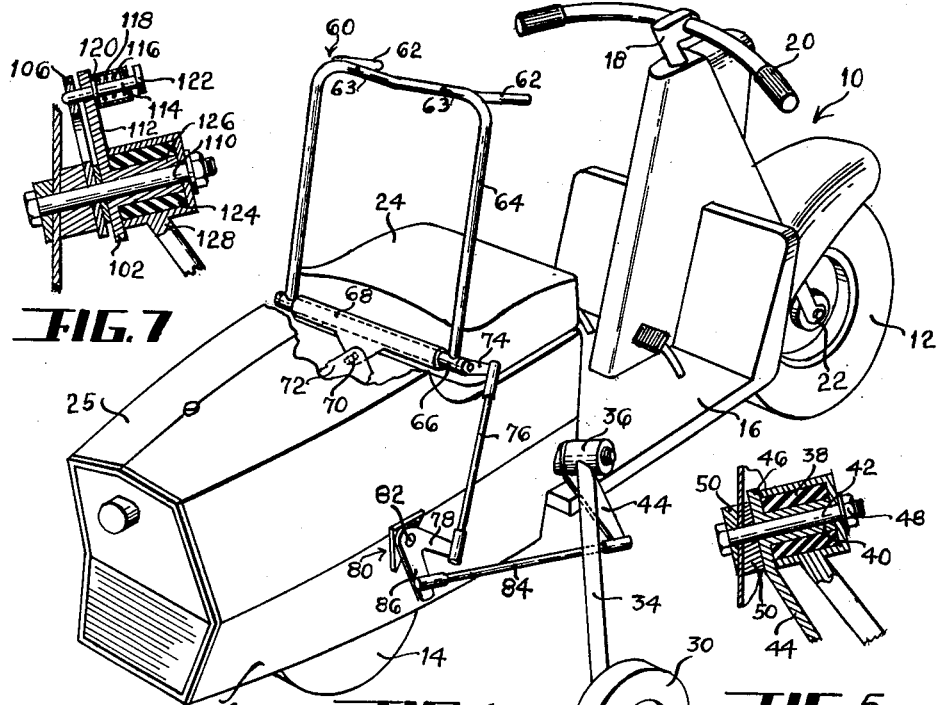
FIGURE 5 is a sectional view of a portion of the balancing mechanism taken along lines 5—5 of FIGURE 3.
FIGURE 7 is a sectional view of a portion of the FIGURE 6 modification taken along the lines 7—7 of FIGURE 6.

As shown in FIGURES 1 to 5, the preferred embodiment of this invention is applied to a motor vehicle or scooter 10 having a front wheel 12 and a rear wheel 14 mounted on a frame including a footrest 16. Movement of the vehicle is controlled by a steering column 18 provided with handle bars 20 which turn the front wheel 12 through a fork mechanism indicated at 22. The scooter 10 also includes a seat 24 provided on a rear housing cover 25 which is mounted upon a rear frame or housing 26. The rear frame or housing 26 and its cover 25 enclose the usual motor and drive mechanism (not shown). It is to be understood that the motor scooter 10 may be of any conventional design and that no claim is made to the details of the scooter as thus far described.

According to this invention, a balancing mechanism is provided for the scooter 10 which includes a pair of balance wheels 30 mounted upon stub shafts 32 which are connected by spindles 34 to a support assembly including a pair of cup-shaped elements 36 mounted adjacent each side of the scooter. Each member 36 is attached by means of a cylindrical elastomeric torsion member 38 to a bushing 40 which is rotatable on a bolt or shaft 42 rigidly attached to the rear frame or housing 26. The outer surface of the elastomeric member 38 is bonded to the inner surface of the cup-shaped member 36 and similarly bonded to the exterior of the bushing 40. An adjusting bar or plate 44, which is integral with the bushing 40, has a flat, disc-shaped portion 46 slidably engageable about the periphery thereof with the cylindrical end of the cup-shaped member 36. The elastomeric torsion member 38 is thus entirely enclosed within the members 36 and 46.

The function of the two support assemblies including the elastomeric torsion members 38 and the adjusting bars or plates 44 will be more fully described later. For the moment, it is sufficient to note that the adjusting bars 44 and their integral bushings 40 may be rotated about the shafts 42. Such rotation will be transmitted to the cup-shaped members 36 and spindles 34 by means of the elastomeric torsion members 38. If, as shown in FIGURE 1, the wheels 30 are engaged with the ground, rotation of the adjusting bars 44 in a counterclockwise direction obviously could not cause rotation of the spindles 34. Under such circumstances, counterclockwise rotation of the adjusting bars or plates 44 place the elastomeric torsion members 38 under tension. Similarly, clockwise rotation of the adjusting bars 44 from the position shown in FIGURE 1 will initially place the elastomeric torsion members under tension due to the weight of the wheels 30. Further clockwise rotation of the bars 44, as viewed in FIGURE 1, causes the spindles 34 to rotate in a clockwise direction to lift the balance wheels 30 above the ground.

Figure 2:
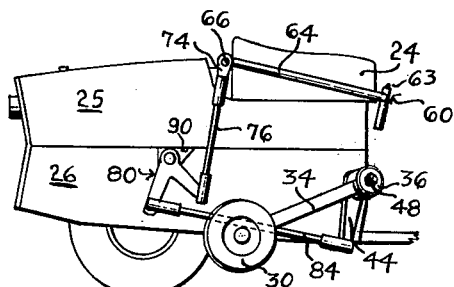
FIGURE 2 is a partial side elevational view of the vehicle of FIGURE 1 showing one position of adjustment of the balance wheels.

Each of the bolts or shafts 42 rigidly connect the assembly of elements 36, 38, 40 and 44 to the rear frame or housing 26 by means of a nut and washer assembly 48. The head of each bolt 42 forming the shaft and the disc-shaped portion 46 of the plate 44 are separated from the housing 26 by means of cooperating cylindrical wedges 50 which hold the shaft 42 at an upwardly and forwardly inclined angle. With this construction, it is found that the assembly is capable of sustaining the weight of the wheels 30 above the ground as shown in FIGURE 2, and as described further below. Also the slight forward inclination of the shaft 42 causes the balance wheels 30 to be spaced further from the side of the vehicle to increase the stability of the vehicle with the balance wheels in engagement with the ground. The upward and forward inclination of the shafts 42 also aids in minimizing skidding of the balance wheels in negotiating turns, as will be discussed later.

The position of the adjusting bar 44 and consequently the amount of tension on the elastomeric member 38 and the rotary position of the spindles 34 are determined by means of an adjusting mechanism including a body-actuatable control mechanism in the form of a backrest 60, which has a pair of forwardly extending arms 62, adapted to engage the sides of an operator of the vehicle sitting upon the seat 24. To accommodate operators having differing back widths, the arms 62 may be adjustably mounted along the top of the backrest in any suitable manner and fixed in an adjusting position by means of setscrews 63 or the like. The backrest 60 also includes a pair of depending legs 64 which are fixedly engaged on opposite ends of a transverse shaft 66. The shaft 66 is rotatably mounted within a sleeve 68 for reasons which will be discussed later. The sleeve 68 is pivotally mounted about a longitudinal axis as shown at 70 to a plate 72 which may be integral with the frame of the vehicle.

It should be noted that the rod 66 will rotate about an axis transverse to the longitudinal axis of the scooter if the top of the backrest 60 is moved back and forth. The rod 66 may also rotate about the longitudinal axis of the scooter at pivot 70 upon sidewise movement of the backrest 60. Rotational movement of the rod 60 about either axis is transferred to the plate 44 by means of a pair of identical motion transfer mechanisms mounted on opposite sides of the vehicle, each of which includes a dead-center mechanism comprised of a crank arm 74, one end of which is rigidly connected to the end of the rod 66 while the other end is pivotally connected to a connecting rod 76. The connecting rod 76 is also pivotally attached to one arm 78 of a bell crank 80 which is pivoted rearwardly of the shaft 42 to the scooter housing at 82. A second connecting rod 84 is pivotally attached at one end to another arm 86 of the bell crank 80 and its other end to the adjusting bar 44. Thus, it may be seen that with the parts in the position shown in FIGURE 1, the backrest 60 may be pivoted backwardly to place the torsion members 38 under tension. If the backrest 60 is pivoted forwardly, the adjusting bars 44 are urged in a counterclockwise direction, as viewed in FIGURE 1, to thereby raise each of the balance wheels 30.

The operation of the device shown in FIGURES 1 to 5 is as follows:

Assuming it is desired to use the balancing mechanism for holding the vehicle 10 upright when at rest but not while in motion, the control and motion transfer mechanisms forming the adjusting mechanisms are positioned as shown in FIGURE 1. In this position, the backrest 60 is engaged with the back of the operator (not shown) sitting in the seat 24. When the vehicle is in motion, the operator leans slightly forwardly so the balance wheels 30 freely rest on the ground. Since the backrest 60 is engaged with the back of the operator, the torsion members 38 cannot rotate about the shafts 42. However, the elastomeric torsion members 38 enable the balance wheels to move vertically with respect to the vehicle body, as the vehicle passes over bumps or uneven road contours. The elastomeric torsion members are especially valuable since the rubber or other elastomeric material dampens the vertical movement of the balance wheels. Effectively, the torsion members serve as both springs and shock absorbers.

If the front wheel 12 should be turned to negotiate a corner, the operator of the vehicle would naturally lean to one side. To enable the vehicle to lean or tilt with the operator, the transverse shaft 66 pivots about the longitudinal pivot 70, thereby causing the rods 76 on opposite sides of the vehicle to move in opposite, substantially vertical directions, the bell cranks 80 to pivot in opposite rotational directions and finally, the rods 84 to move in opposite, substantially horizontal directions to rotate the adjusting bars 44 in opposite directions about the shafts 42. The rotation of the adjusting bars 44 in opposite directions thus causes one wheel 30 to lower and the other to rise with respect to the vehicle. Therefore, while the relative positions of the crank arms 74 and the connecting rods 76 remain the same while negotiating a corner, the balance wheels 30 are moved vertically in opposite directions by a sideways lean of the operator to cause a substantially natural tilt of the vehicle to take place. The position of the vehicle and balancing mechanism when the operator leans to the left is shown in FIGURE 4.

Figure 4:
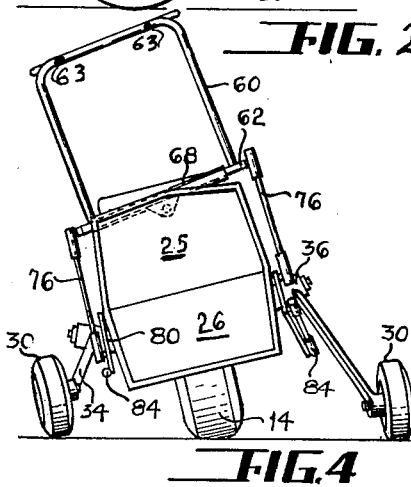
FIGURE 4 is an end view of the vehicle showing the position of the vehicle and balance wheels during turning movement of the vehicle.

Note in the FIGURE 4 position that the balance wheels 30 are tilted in the same direction as the scooter and also are turned in the same direction as the scooter. Thereby the tendency of the wheels to skid is minimized. The tilted and turned orientation of the balance wheels results from the rotation of the wheels about the upwardly and forwardly directed axes of the shafts 42 when the vehicle leans.

As is well known, if a two-wheeled vehicle of the type shown is moving slowly or is at rest, it is almost impossible to balance it in an upright position. With this invention, the operator need only lean back to set the balance wheels 30 so as to prevent any tilting. Where there are considerable stops to be made, or where the vehicle must be driven at such a low speed as to otherwise render balancing difficult, a small backward lean on the part of the operator takes up most of the flexibility provided by the torsion members 36. Also, since the leverage available to the operator as a result of the difference in lengths of the legs 64 and the crank arms 74 is large, very little force is required to rotate the backrest 60 in a counterclockwise direction, as viewed in FIGURE 1, when leaning back, so the tendency of the vehicle to tilt is entirely overcome. That is, the weight of the body leaning against the backrest 60 entirely overcomes the force exerted upon the wheels 30 to rotate about the shafts 42 due to the inherent imbalance of the vehicle, and also renders the torsion members 38 less flexible.

The manner in which a backward lean on the backrest 60 places the torsion members 38 under tension is as follows:

The crank arms 74 rotate counterclockwise as shown in FIGURE 1, thereby causing the bell cranks 80 to likewise pivot counterclockwise. Counterclockwise rotation of the bell cranks 80 causes the adjusting bars 44 to rotate counterclockwise about the shafts 42. Since the wheels 30 are in engagement with the ground, the cup-shaped elements 36 are not free to rotate in a counterclockwise direction. The torsion members 38 are placed under tension due to the relative movement between the bushings 40 which must rotate in a counterclockwise direction as the operator leans back, and the elements 36 which cannot rotate counterclockwise.

Figure 3:
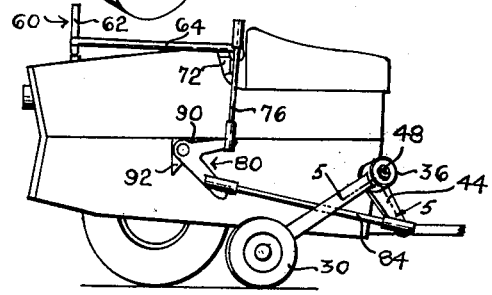
FIGURE 3 is a view similar to FIGURE 2 showing another position of adjustment of the balance wheels.

When it is desired to lock the adjusting mechanism with the wheels firmly engaged with the ground, the control mechanism including the backrest 60 is set as shown in FIGURE 3, so that the spindles 34 are retarded from rotating about the shafts 42. Note in this position that the crank arms 74 and the connecting rods 76 are locked past a dead-center position so that the various parts of the balancing mechanism are held in a fixed position. Also in this position, the adjusting bars 44 are rotated to an extreme counterclockwise orientation, as viewed in FIGURE 3, to somewhat lessen the flexibility of the torsion members 38. Stop lugs 90 may be provided on the mounting plates 92 attached to the vehicle body to prevent pivotal movement of the transverse shaft 66 about the longitudinal pivot 70 when in the position shown in FIGURE 3. With this adjustment, the balancing mechanism is especially effective in rendering the vehicle safe for persons just learning to ride, inasmuch as the scooter is completely stable at slow and medium speeds and at rest. In this manner, the front wheel 12 and balance wheels 30 provide a three point suspension similar to a three-wheeled vehicle.

Finally, the balance wheels 30 may be elevated entirely out of ground engagement by rotating the backrest 60 clockwise to the position shown in FIGURE 2. The legs 64 straddle the sides of the seat 24 so that the entire backrest may be moved thereover and out of engagement with any part of the operator. As shown in FIGURE 2, the crank arms 74 and connecting rods 76 are locked past a second dead-center position with the wheels 30 locked in an elevated postion. The weight of the parts of the balancing mechanism on one side of the vehicle are exactly the same as those on the other. Accordingly, in the FIGURE 2 position, the balancing mechanism has substantially no effect on the operation of the vehicle.

In summary, the device shown in FIGURES 1 to 5 is extremely flexible in application. The wheels 30 may rest on the ground as shown in FIGURE 1 and move vertically with respect to the vehicle by rotating about the shafts 42 to the extent permitted by the torsion members 38. Also, the wheels may be caused to move vertically with respect to the vehicle if the operator leans sideways. Upon leaning sideways, one wheel 30 rises and the other lowers, as shown in FIGURE 4. If the operator leans backwardly, the wheels 30 may be fixed relative to the vehicle body since the flexibility provided by the torsion members 38 is substantially removed. By rotating the backrest counterclockwise to the FIGURE 3 position, the dead-center mechanism is locked past a dead-center position with the wheels 30 fixed in a ground engaging orientation. Finally, the balancing mechanism may be rendered ineffective by rotating the backrest 60 in a clockwise direction to lock it past the dead-center position as shown in FIGURE 2.

It should be noted that the bell cranks 80 are so designed that the initial counterclockwise movement of the backrest 60 from the FIGURE 1 position causes the greatest vertical movement of the connecting rods 76, and accordingly the greatest rotational movement of the bell cranks 80 and the adjusting bars 44. Therefore, the operator need only lean back a short distance to place the torsion members 36 under tension. Further counterclockwise rotational movement has little effect on the torsion members or the position of the wheels, since the connecting rods 76 are substantially at their peak height. The primary effect of continued backward rotation of the backrest is to lock the crank arms 74 and connecting rods 76 past the dead-center position.

Figure 6:
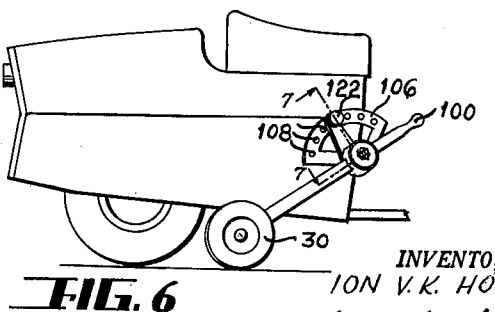
FIGURE 6 is a partial side elevational view of the vehicle provided with a modified balancing mechanism made in accordance with this invention.

Referring now to the modification shown in FIGURES 6 and 7, it will be noted that the control and motion transfer mechanisms in FIGURES 1 to 5 have been replaced by a hand operated control lever 100 which is directly connected to an adjustable backing plate 102 which performs substantially the same function as the adjusting plate 44 shown in FIGURES 1 to 5. A stop plate 106, shaped as a quadrant having apertures 108 on its circumference, is fixedly mounted on a shaft or pivot pin 110 fixed relative to the frame of the vehicle. A stop arm 112 is mounted integrally with the backing plate 102, so that as the control lever 100 is actuated to rotate the backing plate 102 about the pivot pin 110, the stop arm 112 likewise moves with respect to the stop plate 106. Rotation of the control lever 100 may be prevented by a stop pin 114 journaled in the stop arm 112 and held within one of the apertures 108 by means of a spring 116 located within a spring housing 118 mounted on the stop arm 112. The spring 116 engages an annular flange 120 on the stop pin. The pin 114 may be disengaged from an aperture 108 by grasping a knob 122 provided on the stop pin and pulling to contract the spring 116. While only one balancing mechanism is shown in FIGURE 6, a duplicate is provided on the other side of the vehicle.

The operation of the balancing mechanism shown in FIGURES 6 and 7 is believed obvious. When the parts are in the position shown in FIGURE 6, the balance wheel 30 is held in engagement with the ground. The stop mechanism prevents rotation of the wheel 30 about the pivot pin 110, except as permitted by the torsion member 124. By holding the pin 114 free from the stop plate 106 and rotating the control lever 100 in a counterclockwise direction as viewed in FIGURE 6, the torsion member 124 is placed under tension, thereby reducing its flexibility. When the torsion members 124 on each side of the vehicle are under tension, the vehicle is firmly held in an upright position. The flexibility of the torsion members may be varied by rotating the control levers, thereby varying the position of the metal bushings 126 relative to the cup-shaped member 128. In this way the balance wheels 30 may be as flexibly mounted as desired by the operator of the vehicle. Further, by rotating the levers 100 to an extreme clockwise position as viewed in FIGURE 6, the torsion members 124 may be rotated about the shafts 110 to lift the wheels 30 out of ground engagement so the vehicle may be used as though no balancing mechanism were present.

While the embodiment shown in FIGURE 6 does not enable one to vary the tension on the torsion members while the vehicle is in motion, the FIGURE 6 embodiment is quite useful for persons learning to operate motor scooters. As the learner's skill increases, the control lever may be rotated step-by-step in a clockwise direction as viewed in FIGURE 6, to decrease the tension on the torsion member and increase the freedom with which the vehicle may tilt. To insure that an equal amount of tension is placed on both balance wheels when the torsion members are under tension, a level (not shown) may be placed on a horizontal part of the vehicle.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims. As used in the appended claims, the term "side" when used in expressions such as "side of a vehicle" refers to the side of the longitudinal centerline or axis of a vehicle.

Having thus described my invention, I claim:

1. In a balancing mechanism for a two wheel vehicle, a spindle, a balance wheel mounted on said spindle, a support assembly for rotatably mounting said spindle about an upwardly and forwardly inclined axis on the side of a two wheel vehicle, said support assembly including a torsion member and an adjustable control lever for placing said torsion member under tension, and stop means adjacent said support assembly for holding said control lever in a fixed position of adjustment.

2. A balancing mechanism for a vehicle comprising: a pair of torsion members supported on opposite sides of the vehicle, a pair of balance wheels, spindles connected to each of said torsion members for mounting said wheels on the vehicle, said torsion members providing a flexible mounting for said balance wheels whereby said wheels may move vertically with respect to the vehicle, and adjusting means supported by the vehicle for placing said torsion members under tension rendering them substantially inflexible to limit the freedom of vertical movement of said wheels with respect to the vehicle.

3. A balancing mechanism for a vehicle comprising: a pair of support assemblies adapted to be mounted on opposite sides of the vehicle, each of said assemblies including a pair of relatively rotatable elements joined by an elastomeric torsion member; a pair of spindles attached to one of said relatively rotatable elements of each of said pair of support assemblies for rotation therewith; balance wheels mounted on said spindles; and adjusting means attached to the other relatively rotatable element of each support assembly for varying the relative rotary positions of said elements while the balance wheels are engaged with the ground, whereby the torsion members may be placed under different degrees of tension to vary the freedom of rotation of said spindles, said adjusting means including means for maintaining an adjusted relative rotary position of said elements.

4. A balancing mechanism for a vehicle comprising: a pair of balance wheels, spindles rotatably mounted on opposite sides of the vehicle for supporting the balance wheels, and adjusting mechanism for rotating said spindles including a backrest pivotally mounted behind the seat of the vehicle and means connecting said backrest and said spindles including a dead-center mechanism adjustable by pivotal movement of said backrest to move the wheels vertically relative to the vehicle from a ground engaging position to an elevated position, said dead-center mechanism being adjustable by pivotal movement of said backrest to hold the wheels in an elevated position when locked past a dead-center position.

5. The balancing mechanism of claim 4 wherein the backrest includes a pair of legs which straddle the seat of the vehicle in the dead-center position.

6. The mechanism of claim 4 wherein said backrest is pivotal about a transverse axis for vertically moving both said wheels in the same vertical direction, and is pivotal about a longitudinal axis for moving said wheels in opposite vertical directions.

7. A balancing mechanism for a vehicle comprising: a pair of torsion members supported on opposite sides of the vehicle, a pair of balance wheels, spindles connected with each of said torsion members for mounting said wheels on opposite sides of the vehicle, and adjusting mechanism for rotating said torsion members to raise and lower said wheels with respect to the vehicle, whereby said balance wheels may be either in engagement with the surface upon which the vehicle rides or elevated above the surface, said adjusting mechanism including a backrest pivotally mounted about a transverse axis behind the seat of the vehicle and means interconnecting said backrest and said torsion members for transferring pivotal movement of said backrest to rotary movement of the spindle, said backrest extending upwardly for engagement with the back of an operator on said vehicle when the balance wheels are in engagement with the ground, whereby the flexibility provided by the torsion members may be varied by the operator leaning backwardly or forwardly in his seat during movement of the vehicle.

8. A balancing mechanism for a vehicle comprising: a pair of torsion members supported on opposite sides of the vehicle, a pair of balance wheels, spindles connected with each of said torsion members for mouting said wheels on opposite sides of the vehicle, and adjusting mechanism including a backrest for rotating said torsion members to raise and lower said wheels with respect to the vehicle, whereby said balance wheels may be either in engagement with the surface upon which the vehicle rides or elevated above the surface, said backrest extending upwardly for engagement with the back of an operator of the vehicle when the wheels are in engagement with the ground and being pivotally mounted about a transverse axis behind the seat of the vehicle whereby the operator may place the torsion members under tension by leaning backwardly in the seat, said backrest also being pivotal about a longitudinal axis to cause said wheels to move in opposite vertical directions to remain in engagement with the ground when the operator of the vehicle leans sideways causing said backrest to pivot about said longitudinal axis as the vehicle tilts.

9. A balancing mechanism for a vehicle comprising: a pair of torsion members supported on opposite sides of the vehicle, a pair of balance wheels, spindles connected with each of said torsion members for mounting said wheels on opposite sides of the vehicle, and adjusting mechanism including a backrest pivotal about a transverse axis for rotating said torsion members to raise and lower said wheels with respect to the vehicle, whereby said balance wheels may be either in engagement with the surface upon which the vehicle rides or elevated above the surface, said adjusting mechanism being operable to place said torsion members under tension when the wheels are in engagement with said surface, said adjusting mechanism further including a dead-center mechanism which is locked past a dead-center position when said backrest is pivoted to elevate the wheels above the ground, whereby said wheels are held in an elevated position.

10. The mechanism of claim 9 in which the backrest may be pivoted to be locked past a second dead-center position wherein the wheels are held in engagement with the ground and the torsion members are placed under tension to render them less flexible.

11. A balancing mechanism for a vehicle comprising: a pair of balance wheels, spindles rotatably mounted on opposite sides of the vehicle for supporting the balance wheels, and adjusting mechanism for rotating said spindles including a backrest which is pivotal about a transverse axis and about a longitudinal axis, said adjusting mechanism further including means connecting said backrest to said spindles operative to move both said wheels in the same vertical direction when said backrest is pivoted about said transverse axis and operative to move said wheels in opposite vertical directions when said backrest is pivoted about said longitudinal axis.

12. A balancing mechanism for a vehicle comprising: a pair of support assembles adapted to be mounted on opposite sides of the vehicle, each of said assemblies including a pair of relatively rotatable elements joined by an elastomeric torsion member; a pair of spindles attached to one of said relatively rotatable elements of each of said pair of support assemblies for rotation therewith; balance wheels mounted on said spindles; and adjusting means attached to the other relatively rotatable element of each support assembly for varying the relative rotary positions of said elements, whereby the torsion members may be placed under different degrees of tension to vary the freedom of rotation of said spindles, said adjusting means including means for maintaining an adjusted relative rotary position of said elements, said adjusting means further including a pair of hand actuatable control levers, and wherein said means for maintaining the adjusted relative rotary poistion of said elements comprises stop mechanisms connected to said control levers.

13. A balancing mechanism for a vehicle comprising: a pair of support assemblies adapted to be mounted on opposite sides of the vehicle, each of said assemblies including a pair of relatively rotatable elements joined by an elastomeric torsion member; a pair of spindles attached to one of said relatively rotatable elements of each of said pair of support assemblies for rotation therewith; balance wheels mounted on said spindles; and adjusting means attached to the other relatively rotatable element of each support assembly for varying the relative rotary positions of said elements, whereby the torsion members may be placed under different degrees of tension to vary the freedom of rotation of said spindles, said adjusting means including means for maintaining an adjusted relative rotary position of said elements, said adjusting means further including a pivotal control member mounted behind the seat of the vehicle connected to the other of said elements whereby the operator may place both torsion members under tension by leaning backwardly in his seat.

14. The mechanism of claim 13 wherein said means maintaining an adjusted relative rotary position of said elements includes a dead-center mechanism adapted to be locked past a dead-center position.

15. In a balancing mechanism for a two wheel vehicle, the combination comprising: a support assembly adapted to be mounted on the side of a two wheel vehicle, said support assembly including a pair of relatively movable elements and an elastomeric member interconnecting said pair of elements, one of said elements being adapted to be mounted on said side of a vehicle for rotation about an upwardly and forwardly inclined axis relative to the side of the vehicle; a spindle connected to said one element to rotate therewith about said axis; and a balance wheel mounted on said spindle.

16. A balancing mechanism for a vehicle comprising: a pair of support assemblies adapted to be mounted on opposite sides of the vehicle, each of said assemblies including a pair of relatively rotatable elements joined by an elastomeric torsion member; a pair of spindles connected to one of said relatively rotatable elements of each of said pair of support assemblies for rotation therewith about an axis extending upwardly and forwardly relative to the sides of the vehicle; balance wheels mounted on said spindles; and adjusting means attached to the other relatively rotatable element of each support assembly for varying the relative rotary positions of said elements, whereby the torsion members may be placed under different degrees of tension to vary the freedom of rotation of said spindles, said adjusting means including means for maintaining an adjusted relative rotary position of said elements.

17. A balancing mechanism for a vehicle comprising: a pair of balance wheels, spindles rotatably mounted on opposite sides of the vehicle for supporting the balance wheels, and adjusting mechanism for rotating said spindles including a control member which is pivotal about a transverse axis, and about a longitudinal axis, said adjusting mechanism further including means connecting said control member to said spindles operative to move both said wheels in the same vertical direction when said control member is pivoted about said transverse axis and operative to move said wheels in opposite vertical directions when said control member is pivoted about said longitudinal axis.

References Cited in the file of this patent

UNITED STATES PATENTS

| | | |
|---|---|---|
| 92,460 | Laurence | July 13, 1869 |
| 485,572 | Beebe | Nov. 1, 1892 |
| 619,103 | Weyde | Feb. 7, 1899 |
| 1,186,695 | Slocomb | June 13, 1916 |
| 1,993,260 | Burns | Mar. 5, 1935 |
| 2,371,864 | Woolson et al. | Mar. 20, 1945 |
| 2,709,493 | Hupp | May 31, 1955 |
| 2,981,537 | Roe | Apr. 25, 1961 |

FOREIGN PATENTS

| | | |
|---|---|---|
| 689,864 | France | June 3, 1930 |